May 17, 1932.  G. F. BALLERT  1,859,123
BOTTLE HOLDER
Filed Jan. 9, 1931
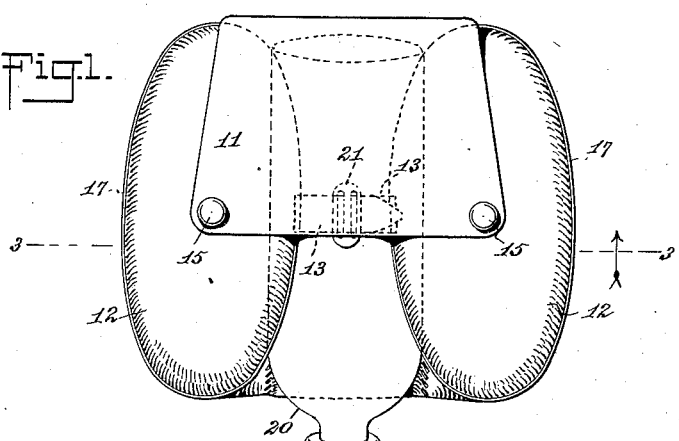
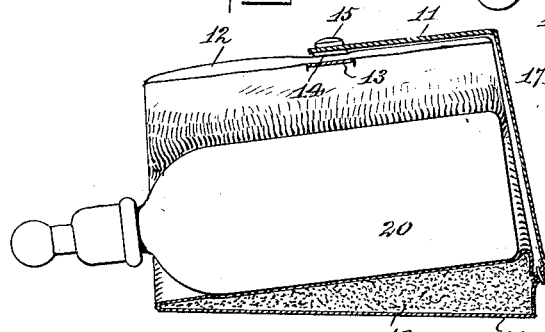
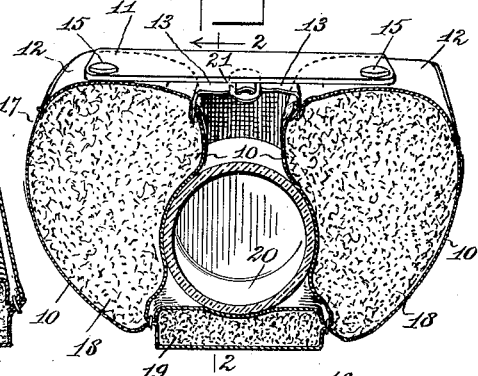
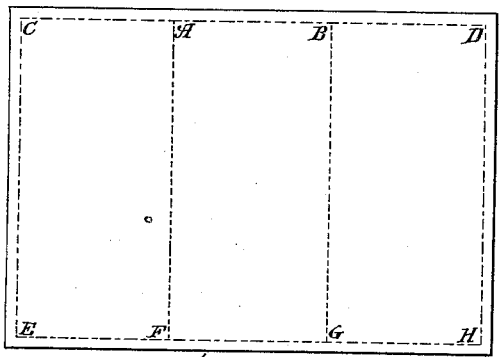
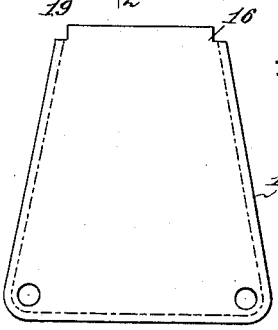
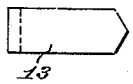
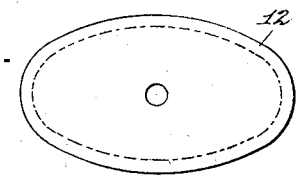
WITNESSES
William P. Goebel
Chris Feinle
INVENTOR
Gertrude F. Ballert
BY Munn & Co.
ATTORNEYS Patented May 17, 1932

1,859,123

UNITED STATES PATENT OFFICE

GERTRUDE F. BALLERT, OF SCOTIA, NEW YORK

BOTTLE HOLDER

Application filed January 9, 1931. Serial No. 507,739.

This invention relates to a holder which may be used advantageously for holding a baby's nursing bottle.

The principal object of the invention is the provision of a holder embodying novel features of construction, whereby a nursing bottle may be held conveniently available to a baby whether lying in a carriage, crib or bed, one which will keep the food warm, one which may easily be washed, and one of efficient and substantial design.

The nature of the invention and its distinguishing features and advantages will appear when the following specification is read in connection with the accompanying drawings, in which Figure 1 is a top view of a holder embodying the features of the invention and showing a bottle held therein;

Figure 2 is a section on the line 2—2 of Figure 3;

Figure 3 is a section on the line 3—3 of Figure 1;

Figures 4 to 7, inclusive, are plan views of pieces used in making the holder.

The holder of the present invention consists of pieces of washable rubberized material. There are two pieces 10 as shown in Figure 4, one piece 11 as shown in Figure 5, two pieces 12 as shown in Figure 6, and two pieces 13 as shown in Figure 7. Each of the pieces 10 is of rectangular shape. The piece 11 is of keystone or trapezoidal shape. Each of the pieces 12 is of elliptical shape. Each of the pieces 13 is in the form of a tab and is made of elastic material.

The directions for making the holder are as follows: A male snap fastener element 14 is fastened to each of the pieces 12 centrally thereof, and a female snap fastener element 15 is fastened to each of two of the corners of the piece 11. The pieces 10 are laid together with the edge 16 of the piece 11 between the same and is secured thereto between the points A and B by a line of stitches which is taken through the pieces 10 and the piece 11 to form a seam between the pieces 10 extending between the points C and D. The pieces 10 are then stitched by lines of stitching E and F, and G and H, leaving them unstitched between the points F and G. The pieces 12 are then inserted respectively at C and E, and D and H, and are sewed in place, thereby forming a tubular body 17. At the time each of the pieces 12 is sewed in place one of the tabs 13 is secured in place by the line of stitching between the related piece 12 and the related end of the piece 10.

The piece 11 constitutes a flap for the body 17. This flap, it will be understood, is attached at one end to the rear of the body 17 centrally thereof. The body 17 is stuffed with cotton through the opening at F and G. The cotton is stuffed tightly into both ends and is designated 18. The pieces 10 are then stitched along the lines A, F and B, G. Cotton is then stuffed in the middle section of the body, so as to be thick at the flap end and gradually thinning down to the front end, this cotton is designated 19. The opening at F, G is then closed by a line of stitches. From the foregoing it will be apparent that a nursing bottle such as the one designated 20 may be laid on the middle section of the body 17 and the ends thereof may be brought upwardly around the bottle and that they may be retained against separation by the straps 13 which are engaged with a buckle member 21. The straps 13 being elastic serve as a tension means to hold the bottle in place. The flap 11 may be brought forwardly over the ends of the body 17 and the fastening elements 15 carried thereby may be snapped into engagement with the fastening elements 14. The flap 11 thus arranged prevents the bottle from being pushed out of the back of the holder, and also materially aids in keeping the food in the bottle warm. It will be apparent that the holder having the features set forth may be placed on a pillow at the baby's head with a bottle in the center of the holder slanting downwardly, as illustrated most clearly in Figure 2. In this way the bottle with its contents will always be held conveniently available to the baby.

I claim:

1. A bottle holder consisting of a stuffed body adapted to embrace the body of a bottle, said stuffed body consisting of end sections and a middle section, the middle section being gradually sloped from back to front for the purpose of retaining the bottle in an inclined position, and tension means secured to the end sections, whereby to tensionally retain the stuffed body in place on the body of the bottle.

2. A bottle holder consisting of a stuffed body adapted to embrace the body of a bottle, said stuffed body consisting of end sections and a middle section, the middle section being gradually sloped from back to front for the purpose of retaining the bottle in an inclined position, tension means secured to the end sections, whereby to tensionally retain the stuffed body in place on the body of the bottle, a flap having one end secured to the back end of said middle section, and coactive fastening elements on the free end of the flap and said end sections to detachably engage the free end of the flap with said end sections, for the purpose of preventing the bottle from being pushed out of the back of the holder and also to aid in keeping warm the contents of the bottle.

3. A bottle holder consisting of a soft body adapted to embrace a bottle, said body consisting of end sections and a middle section, the middle section being gradually sloped from back to front for the purpose of retaining the bottle in an inclined position, and means secured to the end sections, whereby to retain the body in place on the bottle.

4. A bottle holder consisting of a soft body adapted to embrace a bottle, said body consisting of end sections and a middle section, the middle section being gradually sloped from back to front for the purpose of retaining the bottle in an inclined position, means secured to the end sections, whereby to retain the body in place on the bottle, a flap having one end secured to the back end of said middle section, and co-operative fastening means on the flap and said end sections to detachably fasten the flap to said end sections, for the purpose of preventing the bottle from being pushed out of the back of the holder.

GERTRUDE F. BALLERT.